(12) United States Patent
Vialle et al.

(10) Patent No.: US 7,248,645 B2
(45) Date of Patent: Jul. 24, 2007

(54) WIRELESS TRANSMISSION USING AN ADAPTIVE TRANSMIT ANTENNA ARRAY

(75) Inventors: Sandrine Vialle, Gif-sur-Yvette (FR); Nicholas Whinnett, Gif-sur-Yvette (FR); Soodesh Buljore, Gif-sur-Yvette (FR)

(73) Assignee: Motorola, Inc., Schaumburg, IL (US)

( * ) Notice: Subject to any disclaimer, the term of this patent is extended or adjusted under 35 U.S.C. 154(b) by 422 days.

(21) Appl. No.: 10/509,309

(22) PCT Filed: Apr. 18, 2003

(86) PCT No.: PCT/EP03/04184

§ 371 (c)(1),
(2), (4) Date: Sep. 27, 2004

(87) PCT Pub. No.: WO03/094386

PCT Pub. Date: Nov. 13, 2003

(65) Prior Publication Data

US 2005/0117660 A1    Jun. 2, 2005

(30) Foreign Application Priority Data

Apr. 30, 2002    (EP) .................................. 02291093

(51) Int. Cl.
*H04L 27/00*  (2006.01)
(52) U.S. Cl. ...................... 375/299; 708/322; 370/312; 375/147
(58) Field of Classification Search .................... None
See application file for complete search history.

(56) References Cited

U.S. PATENT DOCUMENTS 5,535,150 A * 7/1996 Chiang .................. 708/322

5,537,435 A * 7/1996 Carney et al. .............. 375/219

(Continued)

OTHER PUBLICATIONS

Thompson, J.S. et al.: "Downlink Transmit Diversity Schemes for CDMA Networks", VTC 1999-Fall. IEEE VTS 50th. Vehicular Technology Conference. Gateway to the 21st Century Communications Village. Amsterdam, Sep. 19-22, 1999, IEEE Vehicular Technology Conference, New York, NY: IEEE, U.S., vol. 3 Conf. 50, Sep. 19, 1999, pp. 1382-1386.

(Continued)

*Primary Examiner*—David C. Payne
*Assistant Examiner*—Leon-Viet Q. Nguyen
(74) *Attorney, Agent, or Firm*—Brian M. Mancini; Steven A. May

(57) ABSTRACT

Closed loop wireless communication of signals using an adaptive transmit antenna array, in which multiple copies of signals to be transmitted by the transmit antenna array are produced with delays and weights that are functions of the multi-path transmission channel characteristics from the transmit antenna array to a receive antenna array of a receiver and are combined before transmission by the transmit antenna array. The delays and weights of the transmit copies for each transmit antenna element are functions of the respective multi-path transmission channel characteristics from that transmit antenna element to the receive antenna array such that the multi-path signal components propagated to each receiver element are received with distinguishable delays according to the propagation path. The receiver combines the received signal components from each receive antenna element with delays and weights that are respective functions of the multi-path transmission channels.

15 Claims, 4 Drawing Sheets

U.S. PATENT DOCUMENTS

| | | | |
|---|---|---|---|
| 5,566,209 A * | 10/1996 | Forssen et al. | 375/262 |
| 5,636,246 A * | 6/1997 | Tzannes et al. | 375/260 |
| 5,649,287 A * | 7/1997 | Forssen et al. | 370/312 |
| 6,192,256 B1 * | 2/2001 | Whinnett | 455/562.1 |
| 6,377,631 B1 * | 4/2002 | Raleigh | 375/299 |
| 2001/0024475 A1 * | 9/2001 | Kumar | 375/270 |
| 2002/0006168 A1 * | 1/2002 | Lee et al. | 375/267 |
| 2002/0150155 A1 * | 10/2002 | Florentin et al. | 375/233 |
| 2003/0072354 A1 * | 4/2003 | Chang et al. | 375/147 |
| 2003/0124995 A1 * | 7/2003 | Tanaka | 455/101 |
| 2004/0233871 A1 * | 11/2004 | Seki et al. | 370/331 |
| 2005/0031045 A1 * | 2/2005 | Mayor et al. | 375/260 |
| 2006/0034377 A1 * | 2/2006 | Chan | 375/257 |
| 2006/0098605 A1 * | 5/2006 | Li | 370/338 |

OTHER PUBLICATIONS

Sampath, H. et al.: "Pre-Equalization for Mimo Wireless Channels with Delay Spread", VTC 2000-Fall. IEEE VTS 52$^{nd}$. Vehicular Technology Conference, Boston, MA, Sep. 24-28, 2000, IEEE Vehicular Technology Conference, New York, NY: IEEE, U.S., vol. 3 of 6. Conf. 52, Sep. 24, 2000, pp. 1175-1178.

* cited by examiner

WIRELESS TRANSMISSION USING AN ADAPTIVE TRANSMIT ANTENNA ARRAY

FIELD OF THE INVENTION

This invention relates to closed loop wireless transmission of signals using an adaptive transmit antenna array and is particularly suitable for transmission in a delay-spread environment.

BACKGROUND OF THE INVENTION

Wireless communication systems are assuming ever-increasing importance for the transmission of data, which is to be understood in its largest sense as covering speech or other sounds and images, for example, as well as abstract digital signals.

Currently proposed standards for wireless communication systems include the 3GPP ($3^{rd}$ generation Partnership Project) and 3GPP2 standards, which use Code Division Multiple Access ('CDMA') and Frequency Division Duplex ('FDD') or Time Division Duplex ('TDD'), the HIPERLAN and HIPERLAN2 local area network standards of the European Telecommunications Standards Institute ('ETSI'), which use Time Division Duplex ('TDD') and the International Telecommunications Union ('ITU') IMT-2000 standards. The present invention is applicable to systems of these kinds and other wireless communication systems.

In order to improve the communication capacity of the systems while reducing the sensitivity of the systems to noise and interference and limiting the power of the transmissions, various techniques are used separately or in combination, including space-time diversity, where the same data is transmitted over different transmit and/or receive antenna elements, and frequency spreading, such as Orthogonal Frequency Division Multiplex ('OFDM') where the same data is spread over different channels distinguished by their sub-carrier frequency.

At the receiver, the detection of the symbols is performed utilising knowledge of the complex channel attenuation and phase shifts: the Channel State Information ('CSI'). The Channel State Information is obtained at the receiver by measuring the value of pilot signals transmitted together with the data from the transmitter. The knowledge of the channel enables the received signals to be processed jointly according to the Maximum Ratio Combining technique, in which the received signal is multiplied by the Hermitian transpose of the estimated channel transfer matrix.

Two broad ways of managing the transmit diversity have been categorised as 'closed loop' and 'open loop'. In closed loop signal transmission, information concerning the transmission channels is utilised at the transmitter to improve the communication. For example, the document Tdoc SMG2 UMTS-L1318/98 presented to the ETSI UMTS Physical Layer Expert Group describes operation of a Transmit Adaptive Array (TxAA) FDD scheme in which the dedicated channels are transmitted coherently with the same data and code at each transmit antenna, but with antenna-specific amplitude and phase weighting. The receiver uses pilots transmitted on the Common Channels to separately estimate the channels seen from each antenna. The receiver estimates the weights that should be applied at the transmitter to maximise the power received at the receiver, quantises the weights and feeds them back to the transmitter. The transmitter applies the respective quantised weights to the amplitudes and phases of the signals transmitted from each transmit antenna of the array. U.S. Pat. No. 6,192,256 assigned to the assignee of the present invention describes a closed loop transmission system of this kind. Alternatively, in TDD systems, the channel state information for weighting the signals applied to the downlink transmit antennas may be derived from the uplink signals, assuming that the downlink and uplink channels are reciprocal, without transmission of any specific channel or weighting information from the receiver to the transmitter.

Further improvement in communication may be obtained by use of a RAKE receiver. In a multi-path channel, the original transmitted signal reflects from obstacles such as buildings, and mountains, and the receiver receives several copies of the signal with different delays. If the signals arrive more than one elementary signal element apart from each other, a simple receiver can resolve them. Actually, from each individual multi-path signal's point of view, other multi-path signals can be regarded as interference and they are suppressed by the processing gain of a simple receiver or a single RAKE receiver finger.

A RAKE receiver obtains further benefit by combining the resolved multi-path Signals. The Review "An overview of CDMA evolution toward wideband CDMA" by Ramjee Prasad and Tero Ojanperä, published by IEEE Communications Surveys describes an example of a RAKE receiver. After spreading and modulation the signal is transmitted and the signals in the multi-path channels are delayed and attenuated by respective amounts. The RAKE receiver has a plurality of receiver fingers for receiving different multi-path components of the signal. In each finger, the received signal is correlated by a spreading code, which is time-aligned with the respective measured delay of the multi-path signal. After de-spreading, the signals are weighted and combined, for example by maximal ratio combining, that is to say weighting each signal by the path gain (attenuation factor). Since the received multi-path signals fade independently, diversity order and thus performance are improved.

In practice, movement of a mobile receiver will change the scattering environment and thus the delays and attenuation factors will change as well. The RAKE receiver fingers may be defined by software algorithms rather than by hardware. The transmission multi-path channel profile is measured and the RAKE fingers may then be reallocated. Small-scale changes are taken care of by a code-tracking loop, which tracks the time delay of each multi-path signal.

The document "Transmit diversity with joint pre-distortion", Tdoc 3GPP TSGR1#6(99)918, August 1999 presented to the 3GPP working group 1, proposes for UMTS TDD mode pre-distorting the transmit signals separately (or simultaneously) on each smart antenna element in order to remove the need for joint detection at the receiver: the objective is stated to be to be able to use a single-finger RAKE receiver, that is to say that the transmitted signal is modified so that the received signal appears to the receiver as if it was not a multi-path signal but a single-path signal. No advantage is gained from the multi-path diversity.

The article "Pre-equalization for MIMO wireless channels with delay spread" by H. Sampath, H. Bölcskei, A. J. Paulraj, published by IEEE in VTC 2000 describes an OFDM transmission system in which channel knowledge made available at the transmitter is used to pre-equalise the signals transmitted from the transmit antennas, so as to reduce the complexity of the mobile station. The system includes a Finite Impulse Response (FIR) filter that combines copies of the transmit signals with respective delays and weights (gains) and launches the combined signals from the transmit antennas.

In both case, such schemes attempt to make the channel look flat in order to minimize the interference and avoid the use of a multi-finger RAKE receiver or equaliser at the receiver. The present invention obtains improved performance compared to these systems by exploiting the multipath signals.

SUMMARY OF THE INVENTION

The present invention provides a method of, and apparatus for, closed loop wireless transmission of signals using an adaptive transmit antenna array as described in the accompanying claims.

DETAILED DESCRIPTION OF THE PREFERRED EMBODIMENTS

Figure 1:
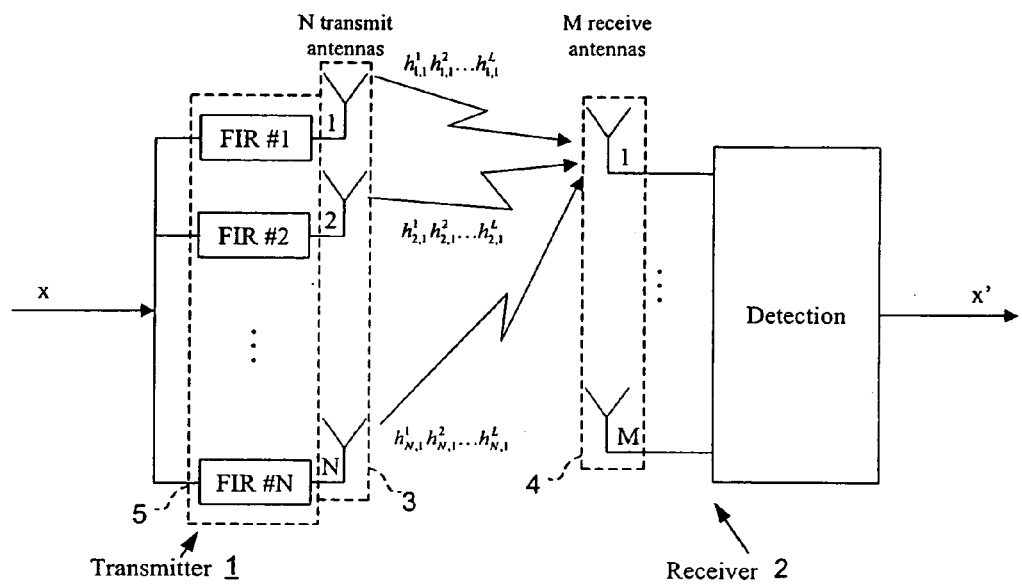
FIG. 1 is a schematic diagram of a communication system in accordance with one embodiment of the invention with N transmit antennas and M receive antennas, given by way of example.

FIG. 1 shows a first embodiment of a system for transmitting data by a transmit diversity wireless communication network, the system comprising a first station 1 that will be described as the transmitter side (with primary reference to its transmission function) and a second station 2 that will be described as the receiver side (with primary reference to its reception function). In the present case, the first station 1 and the second station 2 are both capable of both transmission and reception and, moreover, the same antenna elements are used both for transmission and reception in the preferred embodiment of the invention.

The transmitter side 1 comprises an array 3 of N transmit antenna elements. The receiver side 2 of the system comprises an array 4 of M receive antenna elements. The number of antenna elements on each side is chosen as a compromise between economical considerations and the technical desirability to provide increased channel diversity. In the case of mobile telephony, a single base station serves many hundreds or even thousands of mobile units and it is therefore more economical to add antenna elements to the base station than to the mobile units. In the case of a local area network ('LAN'), however, the cost of the user stations is less critical and a higher number of antennas will be chosen on the user side than in the case of mobile telephony.

Each transmit antenna element in the array 3 transmits over a variety of paths to each of the receive antenna elements in the array 4. Thus, considering the $m^{th}$ receive antenna element out of a total of M, each of the transmit antenna elements 1 to N transmits to the receive antenna element m over a variety of paths due to multiple reflections and scattering, which introduce complex multi-path fading. Let us denote $LT_s$, where $T_s$ is the reciprocal of the sample rate, the temporal window in which the channel energy is constrained. The L coefficients representing the different paths in the channel between transmit antenna n and receive antenna m are denoted $$h_{n,m}^1, \ldots, h_{n,m}^L$$

with n=1, ..., N and m=1, ..., M. For the sake of simplicity we will describe the situation below for the case where M=1. Also, the following description relates to an example of a frequency division duplex wide-band code division multiplex ('FDD W-CDMA') system and is described with reference to transmission from a base station BS to a mobile station MS. Such a scheme can be considered for example for the UMTS FDD mode. However the present invention can be applied to other systems which use transmit diversity in presence of multi-paths.

In operation, each symbol x in the signal to be transmitted is spread and applied on each of the N transmit antennas to a set 5 of Finite Impulse Response (FIR) filters (equivalent to a respective FIR filter for each transmit antenna). The receiver side 2 of the system comprises a demodulator/detector 6 which receives signals from the receive antenna element array 4 and detects the symbols x' from the received elements y after de-spreading and recombination of the signal components from the different paths between the $n^{th}$ transmit antenna and the $m^{th}$ receive antenna. The demodulator/detector 6 comprises a multi-finger RAKE receiver. The RAKE receiver has a receiver finger for each multi-path component. In each finger, the received signal is correlated by a spreading code, which is time-aligned with the delay of the multi-path signal. After de-spreading, the signals are weighted and combined. In a preferred embodiment of the invention, maximal ratio combining is used, that is, each signal is weighted by the path gain.

On the transmit side of the system, the set of N FIR filters 5 is assumed to include a separate FIR filter for each antenna in the transmit array 3, as shown in FIG. 1. Let us denote $w_n = (w_n^1, w_n^2, \ldots w_n^F)^t$ the vector of the F individual coefficients $w_n^1, w_n^2, \ldots w_n^F$ of the FIR filter for the transmit antenna n, where the symbol $(\ )^t$ signifies transposition of the vector. The coefficients $w_n^j$, with n=1, ..., N and j=1, ..., F, are complex coefficients; they are derived from channel transfer coefficients estimated at the receive side 2, when no channel reciprocity can be assumed (e.g., FDD systems), in order to optimise the output of a Rake receiver. Note, however, that when channel state estimation is known at the transmitter this operation can be done at the transmit side (e.g., TDD systems).

Accordingly, the set of FIR filters 5 produces copies of the signals to be transmitted by said transmit antenna array 3, the delays and weights of the transmit copies for each transmit antenna element being functions of the respective multi-path transmission channel characteristics from that transmit antenna element to the receive antenna array 4.

Figure 2:
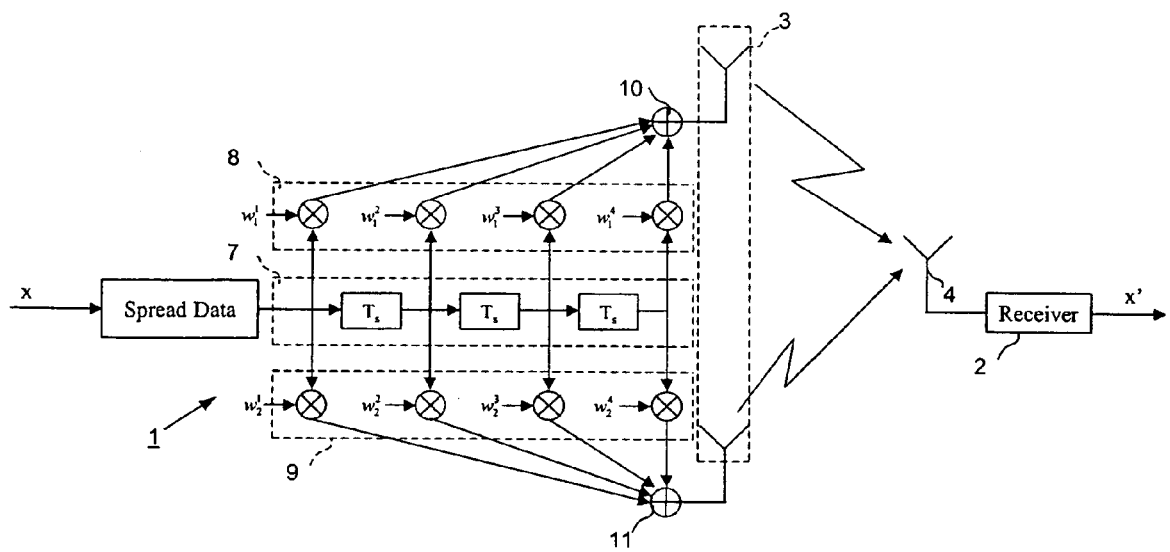
FIG. 2 is a schematic diagram of a communication system of the kind shown in FIG. 1, with 2 transmit antennas and 1 receive antenna.

FIG. 2 shows of an example of one practical embodiment of the set of FIR filters 5, for the specific case of a transmit antenna array 3 comprising two transmit antennas (N=2) and four FIR coefficients per transmit antenna (F=4). In this embodiment, the FIR filters for the two antennas have common delay times, as represented by the common set of (F−1) delay elements, but respective weighting coefficients as represented by the separate sets 8 and 9, each comprising F weighting elements. The signals from the sets of weighting coefficient elements 8 and 9 are then combined as represented by respective adder elements 10 and 11. Although the FIR filter sets 5 and 7 to 11 are represented as physical components, in the preferred embodiment of the invention, the functions of the FIR filters, of delaying, weighting and combining the signals to be transmitted are performed by software algorithms.

Figure 3:
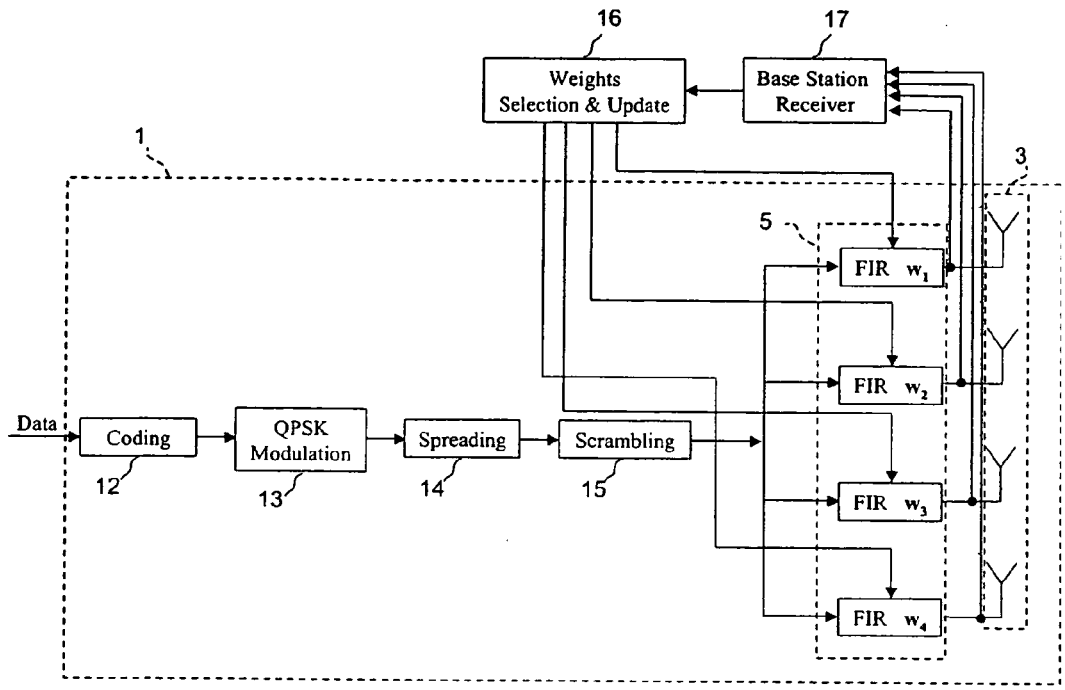
FIG. 3 is a schematic diagram of a base station in a communication system of the kind shown in FIG. 1, with four transmit antennas.
Figure 4:
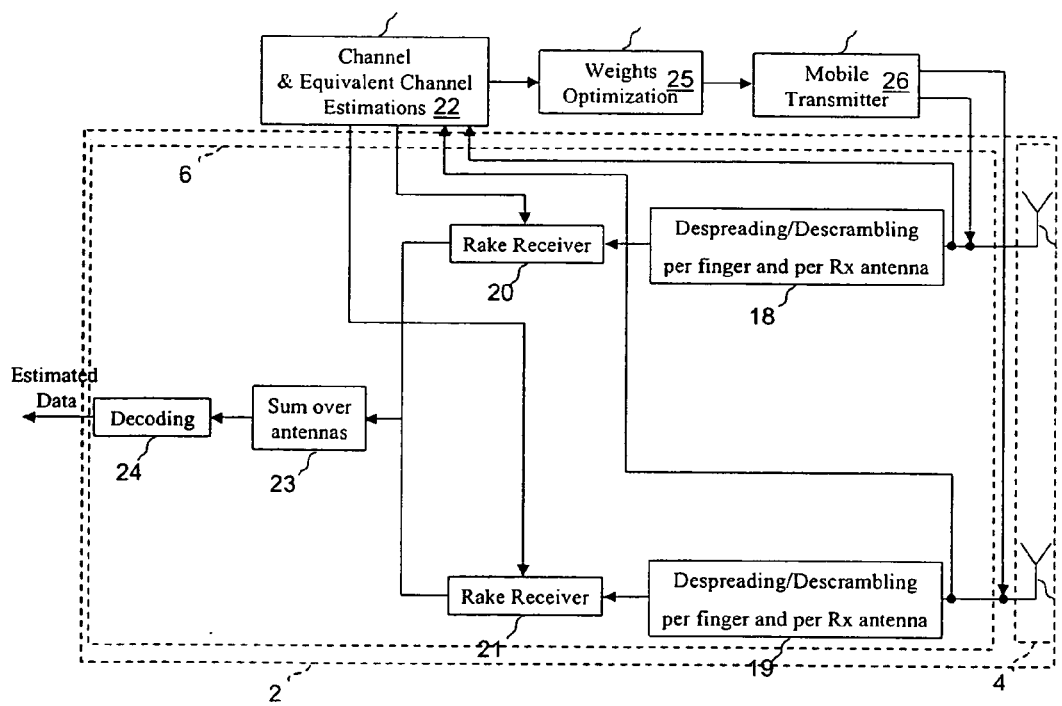
FIG. 4 is a schematic diagram of a mobile station in a communication system of the kind shown in FIG. 1, with two receive antennas.

FIGS. 3 and 4 show an example of the application of a system in accordance with FIG. 1 or FIG. 2 to a frequency division duplex (FDD) system based on a wideband code division multiple access (WCDMA) interface in downlink as specified for example in the 3GPP standard for UMTS but modified to include the transmit diversity system of the embodiment of the present invention shown in FIG. 1 or FIG. 2. The system comprises a base station (FIG. 3) having a transmitter section 1 and a receiver section that use the same antenna array 3 and several mobile stations, one of which is shown in FIG. 4, having a receiver section 2 and a transmitter section that use the same antenna array 4. The embodiment of the invention shown in FIGS. 3 and 4, is shown with N=four transmit aerials at the base station and M=two receive aerials at the mobile station. The method of this embodiment of the invention is described as applied to communication between the transmitter of the base station, shown in FIG. 3, and the receiver of the mobile unit, shown in FIG. 4.

At the base station, data is input to a coding block 12 where CRC attachment, segmentation, channel coding, rate matching, interleaving and multiplexing are performed. The resulting data train is supplied to a QPSK modulation unit 13: each pair of two consecutive symbols is mapped onto a QPSK symbol (e.g. the first bit on the in-phase ('I') branch and the second one on the quadrature ('Q') branch). Then each branch is supplied to a spreading block 14, where the same real-valued channelization code is used to spread to the chip rate the I and Q branches independently. The sequence of the real-valued chips on the I and Q branches is then treated as a sequence of complex-valued chips and is scrambled in a scrambling unit 15 by a complex-valued scrambling code. The resulting sequence of complex-valued chips is fed to the set of FIR filters 5. For each transmit antenna branch #n, (n=1, . . . 4), the sequence of complex-valued chips is supplied to a respective FIR filter of the set 5 whose coefficients and delays are controlled by the weight vector $w_n$, n=1 . . . 4. Each weight vector is derived in a weight selection and update unit 16 from the feedback bits received by a base station receiver 17 (progressive refinement can be used, as described in the contribution by Motorola to a working group for the 3GPP standards entitled "Progressive Refined Tx AA Modes", and referenced TSGR1#7(99)c11, August 30-September 3, Hannover Germany. The resulting signals on each branch are fed to the respective transmit antenna element of the transmit antenna array 3.

Pilot symbols are included in the transmitted signals for each transmit antenna. Two types of pilot symbols are used: dedicated pilot symbols which will undergo the FIR filter on each antenna, and common pilot symbols (CPICH) which will be sent on the Multiple Input Multiple Output channel without FIR filtering. The dedicated pilot symbols will be used in the Rake receivers 6 at the mobile station whereas the CPICH pilot symbols will be considered in the computation of the optimal weight to be applied in transmission. A verification technique is used in a preferred embodiment of the invention, as described in the contribution by Motorola to a working group for the 3GPP standards entitled "Verification algorithm for closed loop transmit diversity mode 2", and referenced TSGR1#15(00)1087, 22-26th, Aug., 2000, Berlin, Germany. Note that when the verification technique is used, a combination of the informations contained in both the dedicated and the common pilot symbols will be used. These channel estimation and equivalent channel estimation (i.e., including the combination of the effect of the FIR filters of the set 5, and the channel response) are computed at the mobile station.

The mobile station shown in FIG. 4 comprises a respective de-spreading and de-scrambling unit 18 and 19 for each receive antenna of the array 4, in which the received signals are de-spread and de-scrambled taking into account the respective delays introduced by the channel and the respective coefficients of the FIR filters of the set 5 used in transmission. These operations are realized on a receive antenna basis and finger basis. One finger is associated to one delay (including delays due to the respective complex coefficients of the FIR filters of the set 5, and the respective delays due to the multipath channel). Note that the recommended number R of fingers is equal to Q+F−1, where Q is the number of non null paths (Q≦L) but can be less without significant degradation if the more relevant fingers are considered. The output of the units 18 and 19 is a set of R copies or replicas of the symbols. After de-spreading and de-scrambling, the R replicas of each symbol are fed to maximum ratio combiners 20 and 21 (one per receive antenna) which combine them according to chosen criteria, such as maximal ratio combining for example in this embodiment. The coefficients to be applied for maximal ratio combining are supplied by a channel estimation unit 22 that receives the signals directly from the antenna array 4. The resulting data from maximum ratio combiners 20 and 21 are then summed (this corresponds to a summation over antennas) in a summing unit 23 and applied to a decoding block 24. The decoding block 24 performs the reverse operation of the coding unit 12 and outputs the estimated data.

The weight optimisation and choice is performed at the mobile unit, in a block 25, using the channel estimation from the unit 22. In a preferred embodiment of the invention, a codebook (or lookup table) is used as described in the contribution by Motorola to a working group for the 3GPP standards entitled "UE Complexity Considerations of Feedback Mode Transmit Diversity", and referenced TSG TSGR1#3(99) 297, 22-26th Mar. 1999, Stockholm. If a codebook is used, as described below, then the optimal set of coefficients for the FIR filters is the set of weights in the codebook that gives the highest received power given by $P=w^H H^H H w$. The identification of resulting set of weights is then sent through a mobile transmitter unit 26 during the uplink phase, respecting the conditions for the feedback such as the number of feedback bits per slot. Note that, as progressive refinement technique can be used, the set of available weights for the optimisation can be reduced in order to take into account the previously sent feedback bits and only update information then needs to be transmitted over the uplink.

Referring again to the more general case shown in FIG. 1, the (L+F−1)- dimensional signal vector $y=(y_1, y_2, \ldots,$ $y_{L+F-1}$) obtained on the receive antenna array 2 can be written, after de-spreading and when interference and noise are ignored, as $$y = Hwx \qquad \text{Eq. 1,}$$

where H is the matrix of the equivalent channel seen by the data symbol x. This equivalent channel results from the convolution of each FIR filter with the channel on each antenna apart from the de-correlation process. The matrix H has L+F−1 rows and N×F columns, and is given by:

$$H = \begin{bmatrix} h_1^1 & 0 & \cdots & 0 & \cdots & h_n^1 & 0 & \cdots & 0 & \cdots\cdots & h_N^1 & 0 & \cdots 0 \\ h_1^2 & h_1^1 & \cdots & \vdots & \cdots & h_n^2 & h_n^1 & \cdots & \vdots & \cdots\cdots & h_N^2 & h_N^1 & \cdots \vdots \\ h_1^3 & h_1^2 & \cdots & \vdots & \cdots & \vdots & \vdots & \cdots & \vdots & \cdots\cdots & \vdots & h_N^2 & \cdots \vdots \\ \vdots & \vdots & \cdots & \vdots & \cdots & \vdots & \vdots & \cdots & \vdots & \cdots\cdots & \vdots & \vdots & \cdots \vdots \\ h_1^L & h_1^{L-1} & \cdots & \vdots & \cdots & h_n^L & \vdots & \cdots & \vdots & \cdots\cdots & h_N^L & h_N^{L-1} & \cdots \vdots \\ 0 & h_1^L & \cdots & \vdots & \cdots & 0 & h_n^L & \cdots & \vdots & \cdots\cdots & 0 & h_N^L & \cdots \vdots \\ 0 & 0 & \cdots & \vdots & \cdots & \vdots & 0 & \cdots & \vdots & \cdots\cdots & 0 & 0 & \cdots \vdots \\ \vdots & \vdots & \cdots & \vdots & \cdots & \vdots & \vdots & \cdots & \vdots & \cdots\cdots & \vdots & \vdots & \cdots \vdots \\ \vdots & \vdots & \cdots & h_1^{L-1} & \cdots & \vdots & \vdots & \cdots & h_n^{L-1} & \cdots\cdots & \vdots & \vdots & \cdots h_N^{L-1} \\ 0 & 0 & \cdots & h_1^L & \cdots & 0 & 0 & \cdots & h_n^L & \cdots\cdots & 0 & 0 & \cdots h_N^L \end{bmatrix} \qquad \text{Eq. 2}$$

In equation Eq. 1, the weight vector w is a column vector of length N×F, that is $w = (w_1^1, w_1^2, \ldots, w_1^F, w_2^1, \ldots, w_N^1, \ldots, w_N^F)$. An ideal maximal ratio combining Rake receiver combines the L+F−1 components of the row vector y by applying the following coefficients:

$$u = \frac{w^H H^H}{\sqrt{w^H H^H H w}}. \qquad \text{Eq. 3}$$

where the exponent H corresponds to the Hermitian transpose and conjugate vector. This means that the pilot sequences sent on each transmit antenna (both dedicated pilot symbols and common pilot symbols in a WCDMA system) are used to estimate the channel coefficients combined with the transmitted weights. Note that in equation Eq. 3, the vector u is normalized so that the noise-plus-interference level at the output of the Rake receiver does not vary with the channel coefficients. The output of the Rake receiver is then equal to:

$$z = \sqrt{w^H H^H H w} \, x \qquad \text{Eq. 4.}$$

If symbol data power is normalized, the instantaneous received power of the desired signal is equal to:

$$P = w^H H^H H w \qquad \text{Eq. 5}$$

The weight vector w is chosen in order to maximize the received power P under the unit norm constraint $\|w\|=1$ so that the total transmit power is also normalized. The analytic solution for w, also called the eigenfilter solution is the eigenvector corresponding to the largest eigenvalue of the matrix $H^H H$ (see for example chapters 4.4 and 4.5 of the book "Adaptive filter theory" by Simon Haykin, published by Prentice Hall).

In one embodiment of the present invention, this analytic solution is computed, quantized, coded and transmitted from the receiver (e.g. mobile station) back to the transmitter (e.g. base station) in the case of FDD WCDMA communication, for example.

In a preferred embodiment of the present invention, the components of the weight vector w are chosen among a list of predefined values stored at the receiver 2 (a look-up table or codebook), such that the resulting vector w maximizes the received power at least approximately, a corresponding list being stored at the transmitter 1. Each predefined value can be the combination of an amplitude value and a phase shift $\alpha \exp(j\Phi)$ or just a phase shift $\exp(j\Phi)$ (apart from the transmit power normalization). A set of potential candidates for the phase shifts is for example $$\varphi \in \left\{ \frac{\pi}{4}, \frac{3\pi}{4}, -\frac{3\pi}{4}, -\frac{\pi}{4} \right\}.$$

An index defining the chosen vector w is then coded and sent back to the transmitter 1 for FDD schemes according to a predefined speed (e.g., one bit per slot), which selects the corresponding vector in its own list. In this example, this means that each weight vector w is coded onto two bits. Note that progressive refinement technique can also be used at both transmitter and receiver. The choice of the method and the quantization parameters depends on the required quality of service (bit-error-rate 'BER', frame-error-rate 'FER', capacity, C/I requirements, feedback speed, channel conditions, . . . ).

When channel reciprocity can be assumed, as for example in TDD systems, the analytic solution as well as the quantization process can be done at the transmitter and do not require any feedback from the receiver.

In a preferred realization of this embodiment the number of coefficients per FIR filter on each transmit antenna of the array 3 is chosen equal to the channel length that is to say equal to the total number of multi-paths L for that channel. This number of coefficients has been found to represent a good compromise between performance and complexity.

Figure 5:
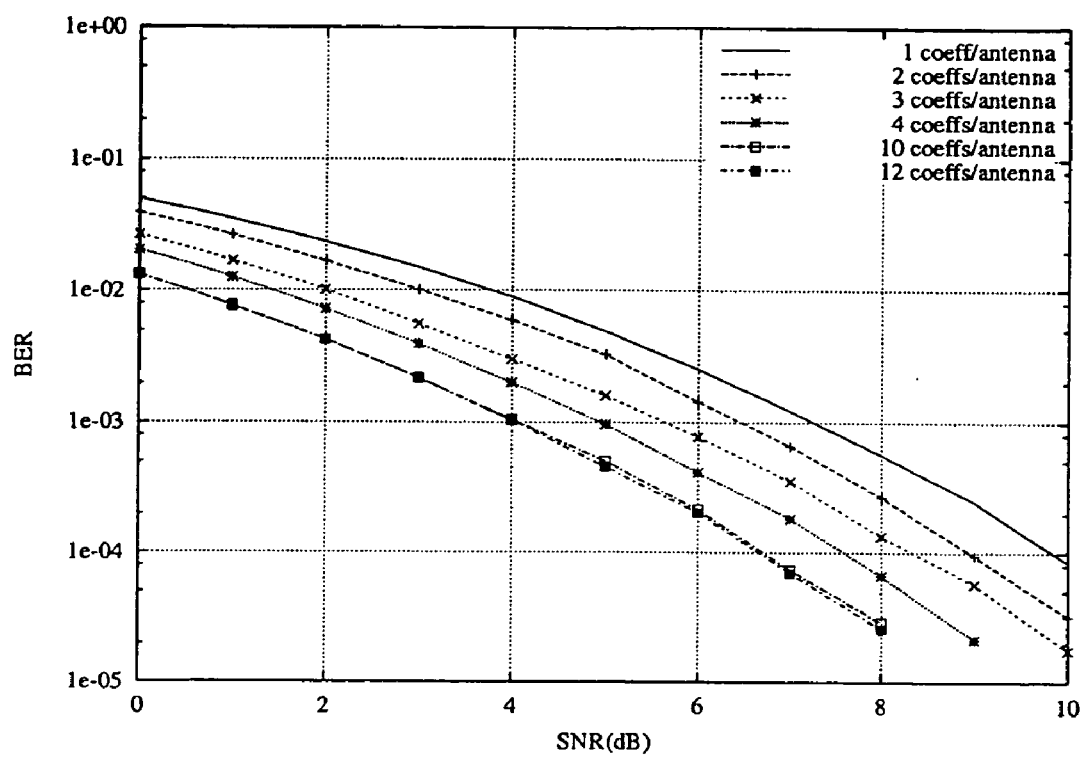
FIG. 5 is a graph of the simulated bit-error-rate of a system of the kind shown in FIG. 2 as a function of the ratio of transmit energy per bit to noise ($E_b/N_o$) for different numbers of FIR coefficients for each transmit antenna.

FIG. 5 represents a simulation of the influence of the number of taps in the FIR filter (taps are spaced Tc apart, where Tc is the chip period), when the multi-path channel on each antenna is composed of 3 taps with respective energy 0.6, 0.3, 0.1 and respective delays 0, 2, 3 Tc. It will be seen that increasing the number of coefficients in the FIR filter results in improving the performance of the TXAA system: with a 4-coefficient FIR filter on each antenna, a gain of 2.3 dB can be obtained compared to a single weight per antenna. Increasing the number of coefficients to 12 leads to an additional gain of 0.9 dB. However it will be seen that there is a saturation effect: in fact a TXAA system with a 12-coefficient FIR achieves substantially the same performance as a TXAA system with a 10-coefficient FIR although it is more complex. It is thus worthwhile to consider a trade-off between complexity (i.e., number of FIR coefficients) and performance.

In accordance with other preferred embodiments, as for example FDD systems, since the amount of signalling between receiver and transmitter (feedback) depends on the number F of coefficients in each FIR filter, it can be desirable to minimize this number, especially when channels with large delay spread are considered. For example, let us consider a channel composed of Q non null paths (Q≦L) corresponding to respective delays $q_1 T_s, q_2 T_s, \ldots, q_Q T_s$, where $q_i \in ]q_{i-1}, q_{i+1}[$ for $i=2, \ldots, Q-1$, $0 \leq q_1 < q_Q = L-1$ ($q_i$ is an integer value). The approach described just above leads to a L-coefficient FIR filter on each antenna, which can be relatively complex if L is large, even if Q is small. In order to deal efficiently with the complexity versus performance problem, this number can be reduced to Q taps, i.e., to selecting only the number of non-negligible or relevant paths in the channel as a function of the number of multi-path trajectories between the transmit antennas and the receive antennas. These taps are not necessarily spaced $T_s$ apart, but are chosen among the positions of the L coefficients corresponding to the delays 0, $T_s$, $2T_s$, . . . , $(L-1)T_s$ (not in terms of amplitude but delay). This is equivalent to consider a vector $w_n$ with L−Q null components, for n= 1, . . . , N.

Let us denote $w_n(Q)$ the Q-dimensional vector obtained from the vector $w_n$ by suppressing its null components. A preferred embodiment which leads to the maximum received energy written for the vector $w(Q)=(w_1(Q), w_2(Q) \ldots, w_N(Q))^t$, is to select the positions of the non null coefficients in $w_n$ at the locations corresponding in terms of delays to the reverse channel filter, i.e., positions $$0, q_Q - q_{Q-1}, \ldots, q_Q - q_1 \quad \text{Eq. 6}$$

The new matrix G, which has Q×N columns and L+F−1 rows (i.e., 2L−1), to be used for power maximization (cf equation Eq. 5) is obtained by suppressing the columns of the matrix H corresponding to the null coefficients in w. The resulting FIR coefficients vector w(Q) are the components of the eigenvector corresponding to the maximum eigenvalue of the matrix $G^H G$. The positions in terms of delays of these coefficients are given by equation Eq. 6.

Figure 6:
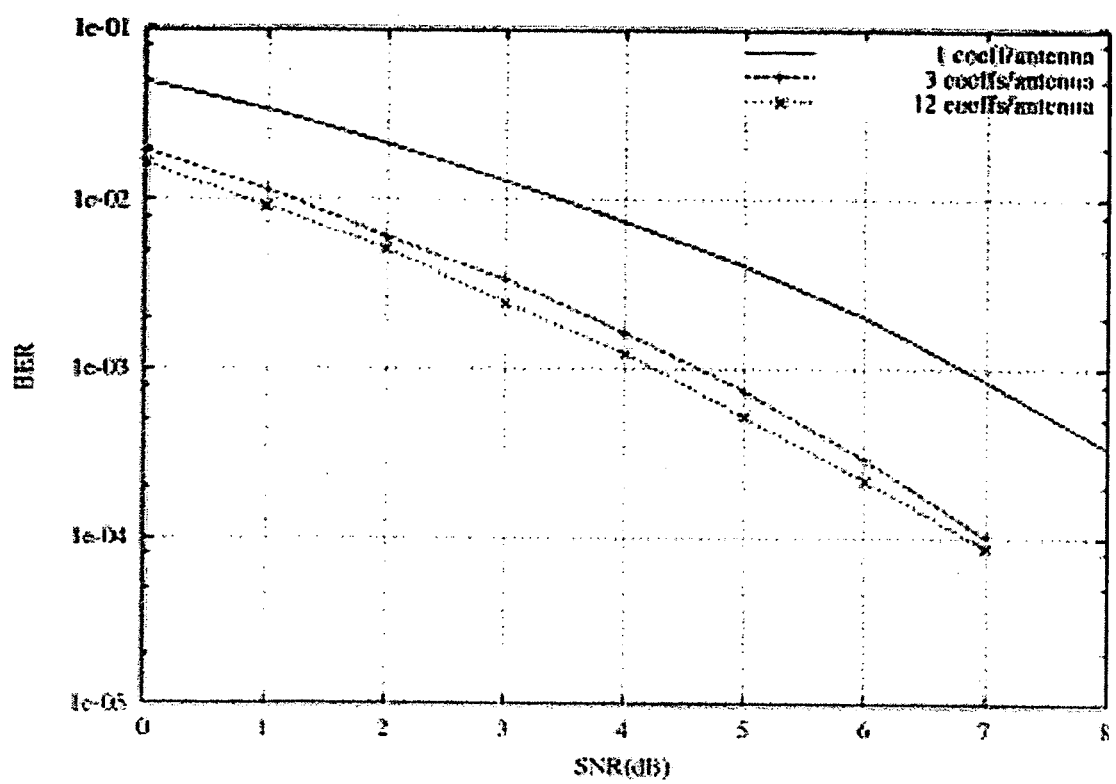
FIG. 6 is a flow chart of a method of selecting FIR filter tap positions, calculating the coefficients and providing feedback from the mobile station to the base station in a preferred embodiment of the invention.

A preferred method of selecting FIR filter tap positions, calculating the coefficients and providing feedback from the mobile station to the base station is shown in FIG. 6. In a first step 27, the tap positions (that is to say the delays) of the FIR filter at the base station are set based on an estimation of the uplink channel. In a second step 28, the weight selection and update unit 16 at the mobile station calculates $G^H G$ for each finger from the downlink signal pilots and, in a third step 29, the mobile station feeds the quantised information w(Q) (amplitude and phase) back to the base station through the uplink feedback (FB I) field to correct the tap positions and FIR coefficients.

As an example let us consider a multi-path channel with Q=3 non null paths located at 0, $2T_c$, $3T_c$, where $T_c$ is the chip duration ($T_s=T_c$ in this case for simplification and L=4. Let us assume also that the system is composed of N=2 transmit antennas and M=1 receive antenna. Finally, the number of coefficients in each FIR filter is supposed to be equal to 4 (i.e., F=4). The corresponding matrix H is give by $$H = \begin{bmatrix} h_1^1 & 0 & 0 & 0 & h_2^1 & 0 & 0 & 0 \\ 0 & h_1^1 & 0 & 0 & 0 & h_2^1 & 0 & 0 \\ h_1^3 & 0 & h_1^1 & 0 & h_2^3 & 0 & h_2^1 & 0 \\ h_1^4 & h_1^3 & 0 & h_1^1 & h_2^4 & h_2^3 & 0 & h_2^1 \\ 0 & h_1^4 & h_1^3 & 0 & 0 & h_2^4 & h_2^3 & 0 \\ 0 & 0 & h_1^4 & h_1^3 & 0 & 0 & h_2^4 & h_2^3 \\ 0 & 0 & 0 & h_1^4 & 0 & 0 & 0 & h_2^4 \end{bmatrix} \quad \text{Eq. 7}$$

The eigenvector $w=(w_1^1, w_1^2, w_1^3, w_1^4, w_2^1, w_2^2, w_2^3, w_2^4)$ corresponding to the maximum eigenvalue of the matrix $H^H H$ leads to the coefficients to be applied on each FIR filter.

If it is assumed that only Q=3 coefficients are non null in each FIR filter and located as described earlier (i.e., corresponding to the delays 0, $T_c$, $3T_c$) then the resulting matrix G is given by $$G = \begin{bmatrix} h_1^1 & 0 & 0 & h_1^1 & 0 & 0 \\ 0 & h_1^1 & 0 & 0 & h_2^1 & 0 \\ h_1^3 & 0 & 0 & h_2^3 & 0 & 0 \\ h_1^4 & h_1^3 & h_1^1 & h_2^4 & h_2^3 & h_2^1 \\ 0 & h_1^4 & 0 & 0 & h_2^4 & 0 \\ 0 & 0 & h_1^3 & 0 & 0 & h_2^3 \\ 0 & 0 & h_1^4 & 0 & 0 & h_2^4 \end{bmatrix}$$

The eigenvector $w(3)=(w_1^1, w_1^2, w_1^4, w_2^1, w_2^2, w_2^4)$ corresponding to the maximum eigenvalue of the matrix $G^H G$ leads to the non-null coefficients to be applied on each FIR filter ($w_1^3 = w_2^3 = 0$).

Let us consider another example through a multipath channel with Q=3 relevant paths located at 0, $10T_c$ and $11T_c$. Then the two proposed schemes consider either a FIR filter with L=12 coefficients per antenna or a FIR filter with only Q=3 well-located coefficients per antenna. If it is assumed that 2 quantization bits are used to determine a coefficient, then the total amount of feedback is divided by 4 with the second approach (24 bits in the first case, only 6 bits in the second one).

The present invention provides a simplification (i.e., Q coefficients instead of L in each FIR filter on each antenna) that results in a loss of only 0.5 dB and still enables more than 2.5 dB gain (when no quantization) for two transmit antennas with respect to the original Tx AA scheme. Note also that quantization, verification, progressive refinement techniques and feedback can be applied to this embodiment as described above.

The invention claimed is:

1. A method of closed loop wireless communication of signals using an adaptive transmit antenna array of size N, in which a plurality M of copies of signals to be transmitted by said transmit antenna array are produced with delays and weights where the weights are functions of the multi-path transmission channel characteristics (H) from said transmit antenna array to a receive antenna array of a receiver and are combined before transmission by said transmit antenna array, the method comprising:
setting said weights substantially equal to a vector w, which is a concatenation of vectors $w_1, w_2, \ldots w_N$, where $w_i=(w_{i,1}, w_{i,2}, \ldots w_{i,M})^t$ represents the coefficients of the FIR filter applied on transmit antenna #i and M is the number of elementary time intervals in the FIR filter delay scheme,
calculating w to be substantially equal to the eigenvector corresponding to the largest eigenvalue of the matrix $H^H H$, where H is the matrix of the equivalent channel seen by the symbol data and $H^H$ is the Hermitian transform of the matrix H,
receiving the multi-path signal components propagated to each receiver element with distinguishable delays according to the propagation path, and
combining by said receiver the received signal components from each receive antenna element with delays and weights (u) that are respective functions of the multi-path transmission channels, wherein said delays and weights applied by said receiver are substantially equal to $$u = \frac{w^H H^H}{\sqrt{w^H H^H H w}}.$$

2. A method as claimed in claim 1, wherein said receiver comprises a multi-finger RAKE receiver that copies the received signals from said receive antenna array with the delays and weights (u).

3. A method as claimed in claim 1, wherein said delays and weights are calculated such as to maximise at least approximately the output of said receiver.

4. A method as claimed in claim 1, wherein the number and delay position of said multi-path transmit copies are selected as a function of the number of multi-path trajectories between the transmit antennas and the receive antennas.

5. A method as claimed in claim 4, wherein the delay positions of said multi-path transmit copies for a given transmit antenna element and the receive antenna array are selected to be substantially equal to 0, $q_Q-q_{Q-1}, \ldots, q_Q-q_1$, where $q_1 T_s, q_2 T_s, \ldots, q_Q T_s$, represent the delays of the Q non-null trajectories between that transmit antenna element and the receive antenna array.

6. A method as claimed in claim 4, wherein w is calculated to be substantially equal to the eigenvector corresponding to the largest eigenvalue of the matrix $G^H G$, where $G^H$ is the Hermitian transform of the matrix G and G is derived from H, which is the matrix of the equivalent channel seen by the symbol data, by setting to null the weight columns in the matrix corresponding to unselected delay values.

7. A method as claimed in claim 5, wherein said delays and weights applied by said receiver are substantially equal to $$u = \frac{w^H G^H}{\sqrt{w^H G^H G w}}.$$

8. A method as claimed in claim 1, wherein the maximum delay between said multi-path transmit copies for any one transmit antenna is substantially equal to the maximum delay between the multi-path trajectories between that transmit antenna and the receive antennas.

9. A transmitter for closed loop wireless communication of signals comprising an adaptive transmit antenna array of size N, finite impulse response filter means for producing a plurality M of multi-path copies of the signals to be transmitted by said transmit antenna array with delays and weights that are functions of the multi-path transmission channel characteristics (H) from said transmit antenna array to a receive antenna array and for combining the copied signals before transmission by the transmit antenna array, the transmitter comprising:

means for setting said weights substantially equal to a vector w, which is a concatenation of vectors $w_1$, $w_2, \ldots w_N$, where $w_i=(w_{i,1}, w_{i,2}, \ldots, w_{i,M})^t$ represents the coefficients of the FIR filter applied on transmit antenna #i and M is the number of elementary time intervals in the FIR filter delay scheme, means for calculating w to be substantially equal to the eigenvector corresponding to the largest eigenvalue of the matrix $H^H H$, where H is the matrix of the equivalent channel seen by the symbol data and $H^H$ is the Hermitian transform of the matrix H, and means for propagating the multi-path signal components to each receiver element which are received with distinguishable delays according to the propagation path, and that the transmitted signals are suitable for reception by a receiver that combines the received signal components from each receive antenna element with delays and weights (u) that are respective functions of the multi-path transmission channels, wherein said delays and weights applied by said receiver are substantially equal to $$u = \frac{w^H H^H}{\sqrt{w^H H^H H w}}.$$

10. A transmitter as claimed in claim 9, comprising channel information means for receiving channel information from said receiver.

11. A transmitter as claimed in claim 10, wherein said channel information means comprises a store for possible delay and weight combination functions of the copied signals and said channel information means identifies delay and weight combination functions from said store as a function of said channel information from said receiver.

12. A receiver comprising a receive antenna array having at least one receive antenna for reception by closed loop wireless communication of signals from a transmitter comprising an adaptive transmit antenna array of size N, in which a plurality M of copies of signals to be transmitted by said transmit antenna array are produced with delays and weights where the weights are functions of the multi-path transmission channel characteristics (H) from said transmit antenna array to a receive antenna array of a receiver and are combined before transmission by said transmit antenna array, said receiver comprises:

receiving means for receiving the multi-path signal components having weights substantially equal to a vector w, which is a concatenation of vectors $w_1$, $w_2, \ldots w_N$, where $w_i=(w_{i,1}, w_{i,2}, \ldots, w_{i,M})^t$ represents the coefficients of the FIR filter applied on transmit antenna #i and M is the number of elementary time intervals in the FIR filter delay scheme, and with w calculated to be substantially equal to the eigenvector corresponding to the largest eigenvalue of the matrix $H^H H$, where H is the matrix of the equivalent channel seen by the symbol data and $H^H$ is the Hermitian transform of the matrix H, said multi-path signal components propagated to each receiver element are received with distinguishable delays according to the propagation path, and combining means for combining the received signal components from each receive antenna element with delays and weights (u) that are respective functions of the multi-path transmission channels, wherein said delays and weights applied by said receiver are substantially equal to $$u = \frac{w^H H^H}{\sqrt{w^H H^H H w}}.$$

13. A receiver as claimed in claim 12, wherein said receiver comprises a multi-finger RAKE receiver that copies the received signals from said receive antenna array with the delays and weights (u).

14. A receiver as claimed in claim 12, comprising channel information means for sending channel information to said transmitter.

15. A receiver as claimed in claim 14, wherein said channel information means comprises a store for possible delay and weight combination functions of the copied signals and said channel information means identifies functions from said store as a function of said channel information for said transmitter.

* * * * *